(12) United States Patent
Grube et al.

(10) Patent No.: US 12,181,969 B2
(45) Date of Patent: *Dec. 31, 2024

(54) SENDING ENCODED DATA SLICES VIA MULTIPLE ROUTING PATHS

(71) Applicant: Pure Storage, Inc., Santa Clara, CA (US)

(72) Inventors: Gary W. Grube, Barrington Hills, IL (US); Timothy W. Markison, Mesa, AZ (US); S. Christopher Gladwin, Chicago, IL (US); Greg R. Dhuse, Chicago, IL (US); Andrew D. Baptist, Mt. Pleasant, WI (US); Ilya Volvovski, Chicago, IL (US); Jason K. Resch, Warwick, RI (US)

(73) Assignee: Pure Storage, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,319

(22) Filed: Nov. 1, 2023

(65) Prior Publication Data

US 2024/0078154 A1 Mar. 7, 2024

Related U.S. Application Data

(63) Continuation of application No. 18/054,992, filed on Nov. 14, 2022, now Pat. No. 11,815,998, which is a
(Continued)

(51) Int. Cl.
*G06F 11/10* (2006.01)
*G06F 3/06* (2006.01)
*G06F 11/00* (2006.01)

(52) U.S. Cl.
CPC ........ *G06F 11/1076* (2013.01); *G06F 3/0619* (2013.01); *G06F 3/064* (2013.01); *G06F 3/067* (2013.01)

(58) Field of Classification Search
CPC ...... G06F 3/064; G06F 3/067; G06F 11/1076; G06F 3/0619
See application file for complete search history.

(56) References Cited

U.S. PATENT DOCUMENTS 4,092,732 A 5/1978 Ouchi
5,454,101 A 9/1995 Mackay
(Continued)

OTHER PUBLICATIONS

A. Albanese, J. Blomer, J. Edmonds, M. Luby and M. Sudan, "Priority encoding transmission," Foundations of Computer Science, 1994 Proceedings., 35th Annual Symposium on, Santa Fe, NM, 1994, pp. 604-612.
(Continued)

*Primary Examiner* — Justin R Knapp
(74) *Attorney, Agent, or Firm* — Garlick & Markison; Timothy D. Taylor

(57) ABSTRACT

A method for execution by one or more computing devices includes selecting a first routing path from a plurality of routing paths to a set of storage units based on routing path performance information, where the first routing path has a performance level greater than a first performance threshold. The method further includes selecting a second routing path from the plurality of routing paths based on the routing path performance information, where the second routing path has a performance level less than or equal to the first performance threshold. The method further includes sending a first subset of encoded data slices to the set of storage units via the first routing path for storage therein. The method further includes sending a second subset of encoded data slices to the set of storage units via the second routing path for storage therein.

20 Claims, 7 Drawing Sheets

Related U.S. Application Data continuation of application No. 17/249,539, filed on Mar. 4, 2021, now Pat. No. 11,526,398, which is a continuation of application No. 16/378,041, filed on Apr. 8, 2019, now Pat. No. 10,970,168, which is a continuation-in-part of application No. 15/817,104, filed on Nov. 17, 2017, now Pat. No. 10,298,957, which is a continuation-in-part of application No. 14/615,655, filed on Feb. 6, 2015, now Pat. No. 9,843,412, which is a continuation-in-part of application No. 13/251,603, filed on Oct. 3, 2011, now Pat. No. 9,037,937.

(60) Provisional application No. 61/390,472, filed on Oct. 6, 2010.

(56) References Cited

U.S. PATENT DOCUMENTS

| | | |
|---|---|---|
| 5,485,474 A | 1/1996 | Rabin |
| 5,774,643 A | 6/1998 | Lubbers |
| 5,802,364 A | 9/1998 | Senator |
| 5,809,285 A | 9/1998 | Hilland |
| 5,890,156 A | 3/1999 | Rekieta |
| 5,987,622 A | 11/1999 | Lo Verso |
| 5,991,414 A | 11/1999 | Garay |
| 6,012,159 A | 1/2000 | Fischer |
| 6,058,454 A | 5/2000 | Gerlach |
| 6,128,277 A | 10/2000 | Bruck |
| 6,175,571 B1 | 1/2001 | Haddock |
| 6,192,472 B1 | 2/2001 | Garay |
| 6,256,688 B1 | 7/2001 | Suetaka |
| 6,272,658 B1 | 8/2001 | Steele |
| 6,301,604 B1 | 10/2001 | Nojima |
| 6,356,949 B1 | 3/2002 | Katsandres |
| 6,366,995 B1 | 4/2002 | Vilkov |
| 6,374,336 B1 | 4/2002 | Peters |
| 6,415,373 B1 | 7/2002 | Peters |
| 6,418,539 B1 | 7/2002 | Walker |
| 6,449,688 B1 | 9/2002 | Peters |
| 6,567,948 B2 | 5/2003 | Steele |
| 6,571,282 B1 | 5/2003 | Bowman-Amuah |
| 6,609,223 B1 | 8/2003 | Wolfgang |
| 6,718,361 B1 | 4/2004 | Basani |
| 6,760,808 B2 | 7/2004 | Peters |
| 6,785,768 B2 | 8/2004 | Peters |
| 6,785,783 B2 | 8/2004 | Buckland |
| 6,826,711 B2 | 11/2004 | Moulton |
| 6,879,596 B1 | 4/2005 | Dooply |
| 7,003,688 B1 | 2/2006 | Pittelkow |
| 7,024,451 B2 | 4/2006 | Jorgenson |
| 7,024,609 B2 | 4/2006 | Wolfgang |
| 7,080,101 B1 | 7/2006 | Watson |
| 7,080,309 B2 | 7/2006 | Sharma |
| 7,103,824 B2 | 9/2006 | Halford |
| 7,103,915 B2 | 9/2006 | Redlich |
| 7,111,115 B2 | 9/2006 | Peters |
| 7,140,044 B2 | 11/2006 | Redlich |
| 7,146,644 B2 | 12/2006 | Redlich |
| 7,171,493 B2 | 1/2007 | Shu |
| 7,222,133 B1 | 5/2007 | Raipurkar |
| 7,240,236 B2 | 7/2007 | Cutts |
| 7,272,613 B2 | 9/2007 | Sim |
| 7,275,103 B1 | 9/2007 | Thrasher et al. |
| 7,467,263 B2 * | 12/2008 | Ozaki ............... G06F 3/067 709/224 |
| 7,620,710 B2 * | 11/2009 | Kottomtharayil ....... G06F 16/10 709/224 |
| 7,636,724 B2 | 12/2009 | De La Torre |
| 8,122,511 B2 * | 2/2012 | Ishigaki ............ G06Q 20/367 713/172 |
| 8,554,947 B1 * | 10/2013 | Kubat ............... H04L 1/22 709/239 |
| 8,612,821 B2 | 12/2013 | Grube |
| 9,076,138 B2 | 7/2015 | Resch |
| 9,501,349 B2 | 11/2016 | Resch |
| 9,762,395 B2 | 9/2017 | Kazi |
| 10,394,613 B2 | 8/2019 | Grube |
| 2002/0024964 A1 | 2/2002 | Baum |
| 2002/0062422 A1 | 5/2002 | Butterworth |
| 2002/0166079 A1 | 11/2002 | Ulrich |
| 2003/0018927 A1 | 1/2003 | Gadir |
| 2003/0037261 A1 | 2/2003 | Meffert |
| 2003/0065617 A1 | 4/2003 | Watkins |
| 2003/0084020 A1 | 5/2003 | Shu |
| 2004/0024963 A1 | 2/2004 | Talagala |
| 2004/0122917 A1 | 6/2004 | Menon |
| 2004/0215998 A1 | 10/2004 | Buxton |
| 2004/0228493 A1 | 11/2004 | Ma |
| 2005/0100022 A1 | 5/2005 | Ramprashad |
| 2005/0114594 A1 | 5/2005 | Corbett |
| 2005/0125593 A1 | 6/2005 | Karpoff |
| 2005/0131993 A1 | 6/2005 | Fatula, Jr. |
| 2005/0132070 A1 | 6/2005 | Redlich |
| 2005/0144382 A1 | 6/2005 | Schmisseur |
| 2005/0229069 A1 | 10/2005 | Hassner |
| 2006/0047907 A1 | 3/2006 | Shiga |
| 2006/0136448 A1 | 6/2006 | Cialini |
| 2006/0156059 A1 | 7/2006 | Kitamura |
| 2006/0224603 A1 | 10/2006 | Correll, Jr. |
| 2007/0079081 A1 | 4/2007 | Gladwin |
| 2007/0079082 A1 | 4/2007 | Gladwin |
| 2007/0079083 A1 | 4/2007 | Gladwin |
| 2007/0088970 A1 | 4/2007 | Buxton |
| 2007/0174192 A1 | 7/2007 | Gladwin |
| 2007/0214285 A1 | 9/2007 | Au |
| 2007/0234110 A1 | 10/2007 | Soran |
| 2007/0283167 A1 | 12/2007 | Venters, III |
| 2009/0094251 A1 | 4/2009 | Gladwin |
| 2009/0094318 A1 | 4/2009 | Gladwin |
| 2009/0271513 A1 | 10/2009 | Liu et al. |
| 2010/0023524 A1 | 1/2010 | Gladwin |
| 2010/0306524 A1 | 12/2010 | Runkis |
| 2015/0067445 A1 | 3/2015 | Resch |
| 2015/0317196 A1 | 11/2015 | Kazi |

OTHER PUBLICATIONS

Chung; An Automatic Data Segmentation Method for 3D Measured Data Points; National Taiwan University; pp. 1-8; 1998.

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

(56) References Cited

OTHER PUBLICATIONS

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

\* cited by examiner

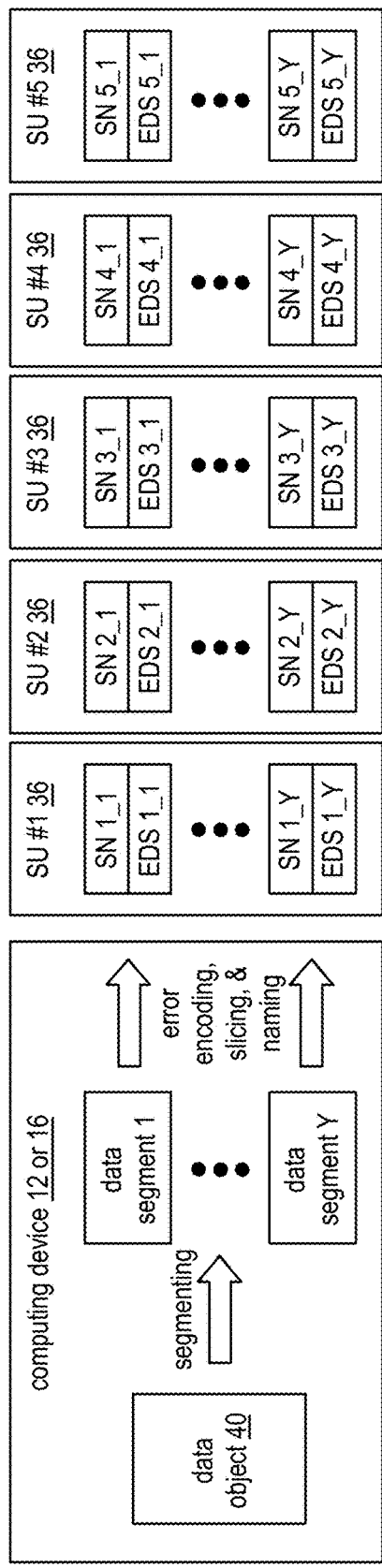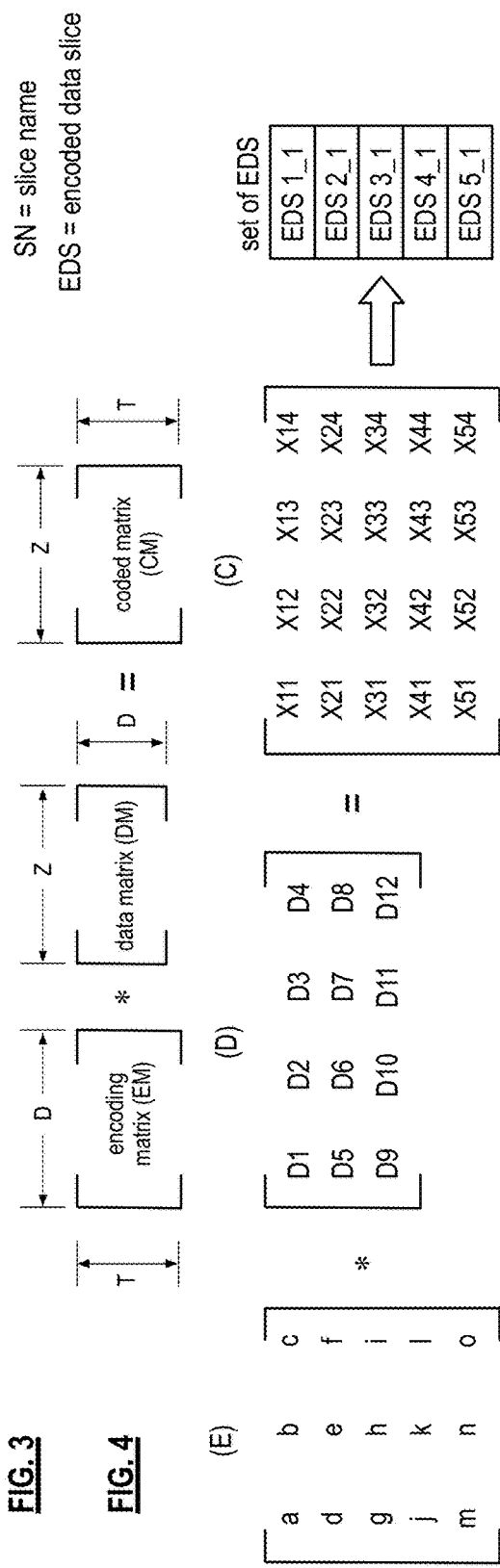

SENDING ENCODED DATA SLICES VIA MULTIPLE ROUTING PATHS

CROSS-REFERENCE TO RELATED APPLICATIONS

This application claims priority pursuant to 35 U.S.C. § 120 as a continuation of U.S. Utility application Ser. No. 18/054,992, entitled "SELECTING ROUTING PATHS FOR SENDING ENCODED DATA SLICES," filed Nov. 14, 2022, scheduled to issue as U.S. Pat. No. 11,815,998 on Nov. 14, 2023, which is a continuation of U.S. Utility application Ser. No. 17/249,539, entitled "DETERMINING AN ERROR ENCODING FUNCTION RATIO BASED ON PATH PERFORMANCE," filed Mar. 4, 2021, issued as U.S. Pat. No. 11,526,398 on Dec. 13, 2022, which is a continuation of U.S. Utility application Ser. No. 16/378,041, entitled "ADJUSTING DISPERSED STORAGE ERROR ENCODING PARAMETERS BASED ON PATH PERFORMANCE," filed Apr. 8, 2019, issued as U.S. Pat. No. 10,970,168 on Apr. 6, 2021, which is a continuation-in-part of U.S. Utility application Ser. No. 15/817,104, entitled "CONTENT-BASED ENCODING IN A MULTIPLE ROUTING PATH COMMUNICATIONS SYSTEM," filed Nov. 17, 2017, issued as U.S. Pat. No. 10,298,957 on May 21, 2019, which is a continuation-in-part of U.S. Utility application Ser. No. 14/615,655, entitled "OPTIMIZING ROUTING OF DATA ACROSS A COMMUNICATIONS NETWORK," filed Feb. 6, 2015, issued as U.S. Pat. No. 9,843,412 on Dec. 12, 2017, which is a continuation-in-part of U.S. Utility application Ser. No. 13/251,603, entitled "RELAYING DATA TRANSMITTED AS ENCODED DATA SLICES," filed Oct. 3, 2011, issued as U.S. Pat. No. 9,037,937 on May 19, 2015, which claims priority pursuant to 35 U.S.C. § 119(e) to U.S. Provisional Application No. 61/390,472, entitled "COMMUNICATIONS UTILIZING INFORMATION DISPERSAL," filed Oct. 6, 2010, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Data can be sent via one or more routing paths in a multiple routing path communication system.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
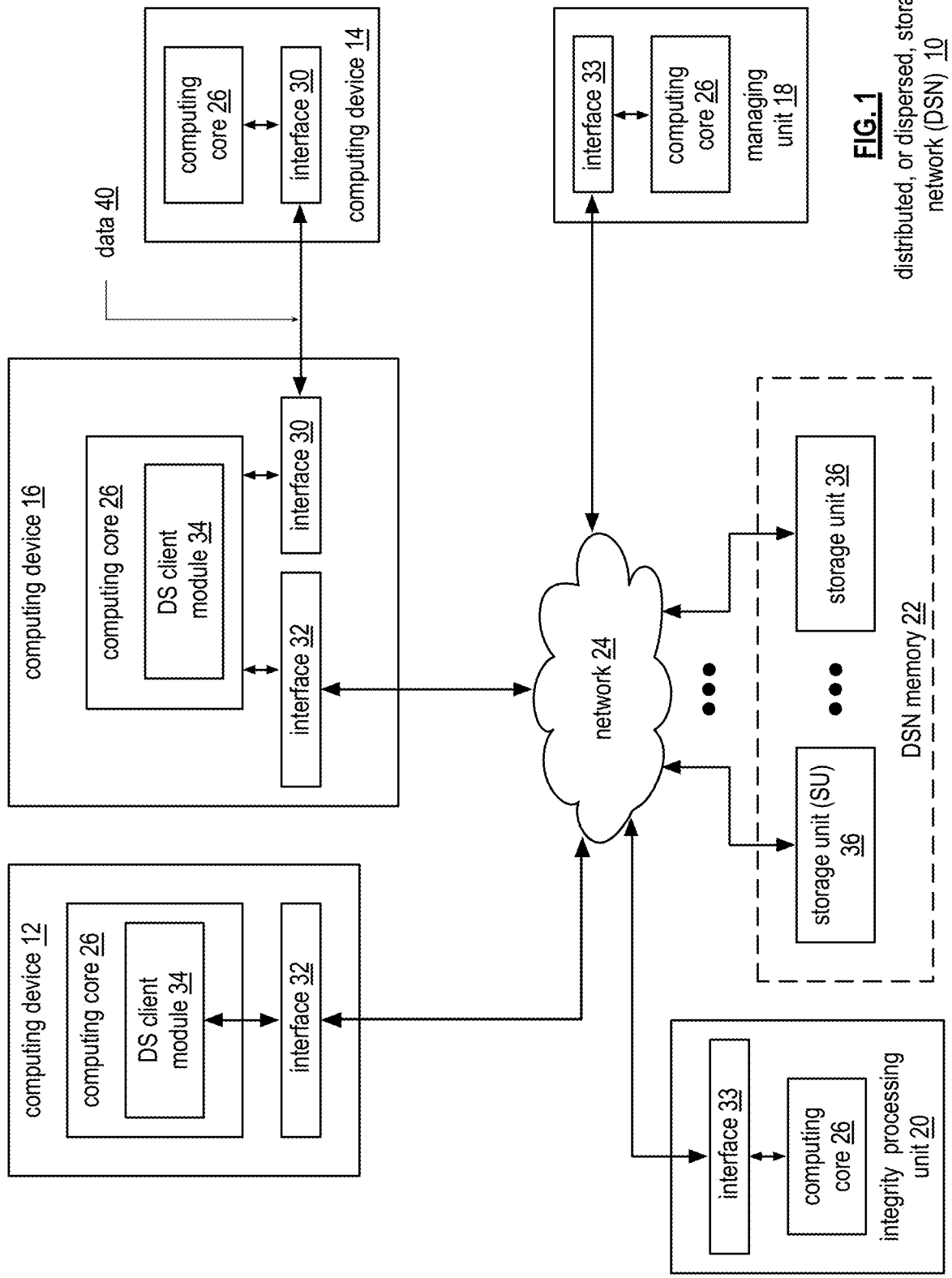
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
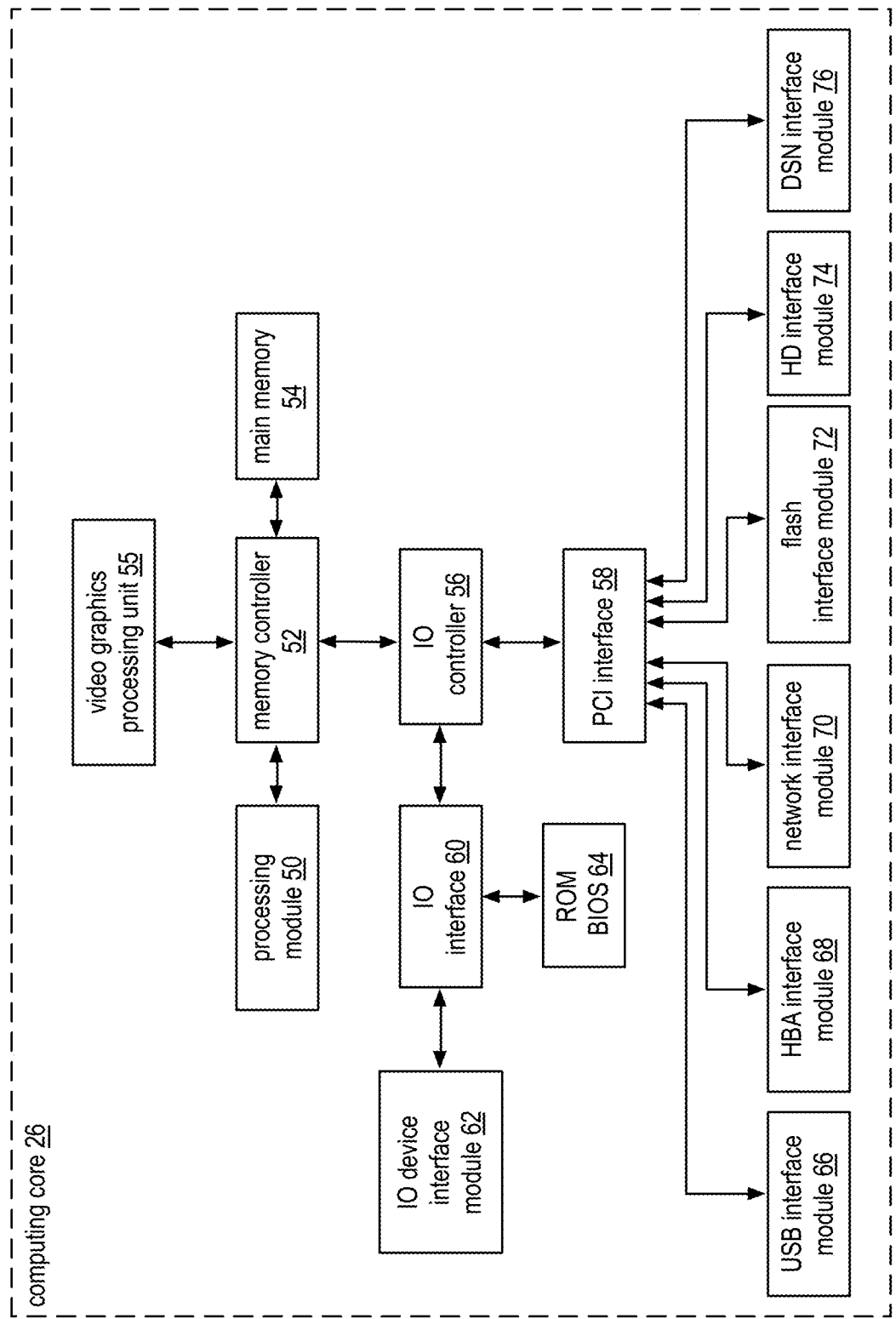
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
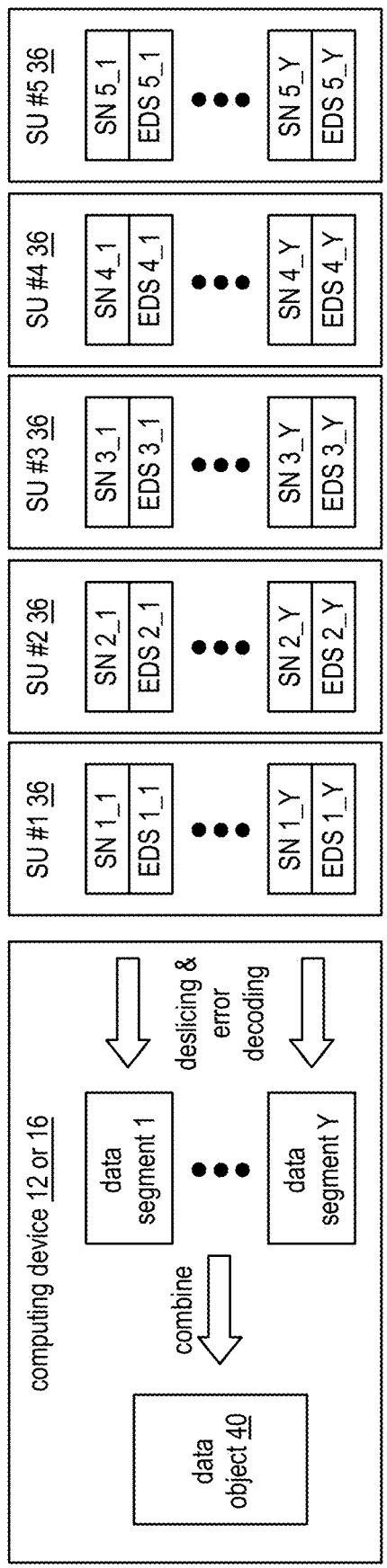
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
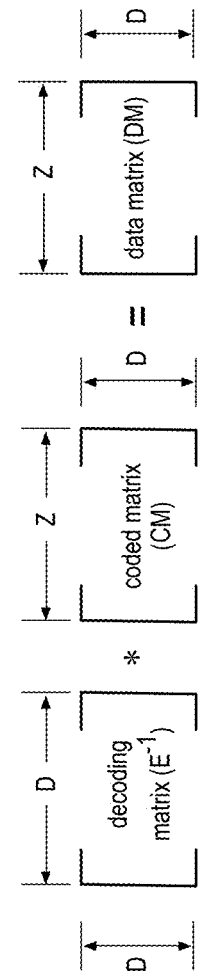
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
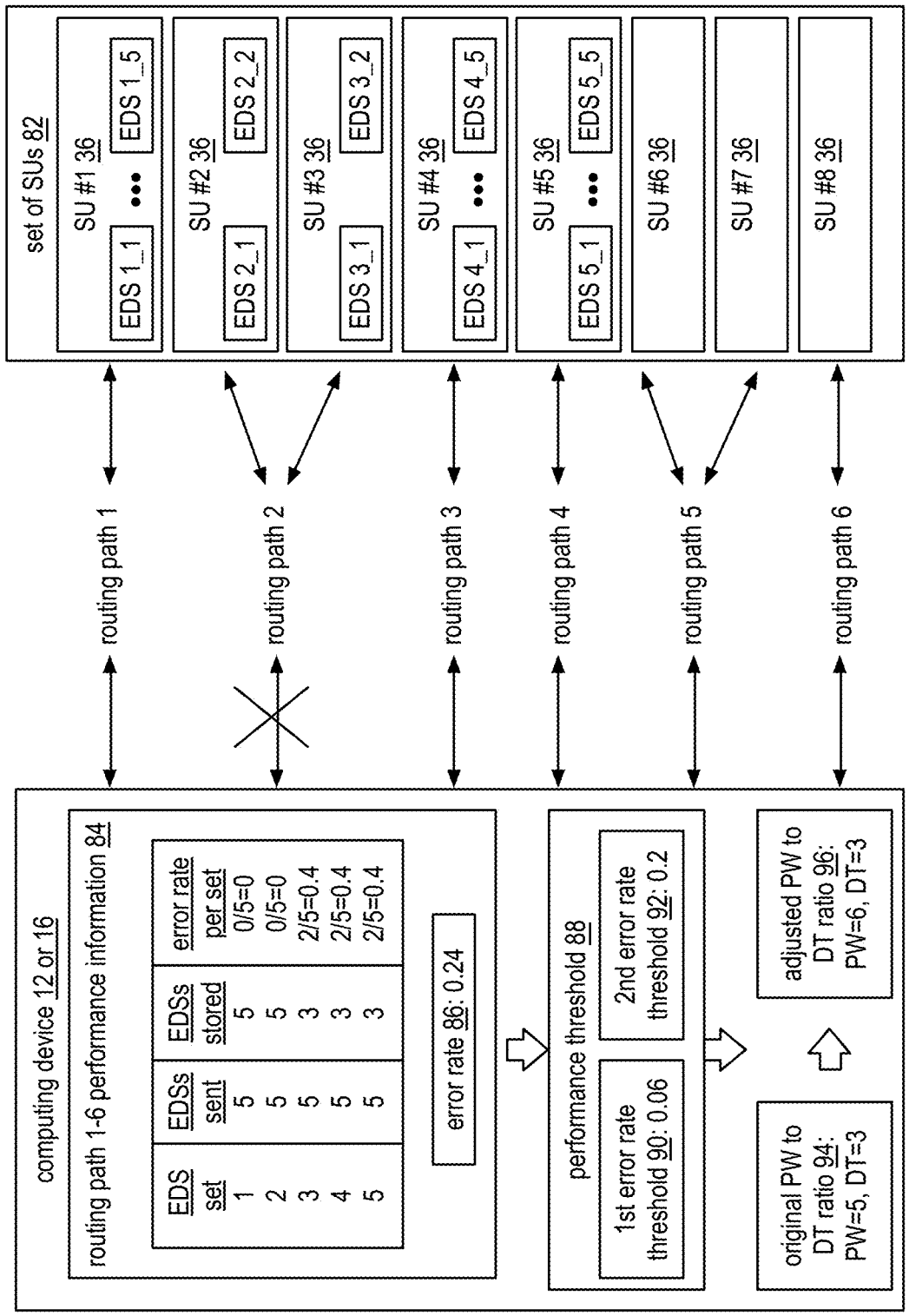
FIG. 9 is a schematic block diagram of another embodiment of the dispersed or distributed storage network (DSN) in accordance with the present invention.

FIG. 9 is a schematic block diagram of another embodiment of the dispersed or distributed storage network (DSN) that includes computing device 12 or 16 and a set of storage units (SUs) 82. The set of storage units 82 includes eight storage units SUs #1-#8 36. Computing device 12 or 16 dispersed storage error encodes a data object into a plurality of sets of encoded data slices (EDSs) and sends the plurality of sets of encoded data slices to the set of storage units 82 via one or more routing paths 1-6 for storage therein. Routing paths 1-6 include one or more wireless connections and/or lossy wired connections.

Computing device 12 or 16 determines routing path performance information 84 for routing paths 1-6 with respect to the set of storage units 82. Routing path performance information 84 includes a number of encoded data slices of each of the plurality of sets of encoded data slices sent to the set of storage units 82 during a time period, a number of encoded data slices of each of the plurality of sets of encoded data slices successfully stored by the set of storage units 82 during the time period, and an error rate associated with the set of storage units 82 based on the number of encoded data slices sent and the number of encoded data slices successfully stored.

As a specific example, during a time period, five sets of encoded data slices (e.g., a data object is dispersed storage error encoded to produce five sets of encoded data slices) are sent to the set of storage units 82 via routing paths 1-6 for storage therein. The sets of encoded data slices have a pillar width of 5 and a decode threshold of 3. Therefore, the five sets of encoded data slices are sent to five storage units of the set of storage units. For example, EDSs 1_1-1_5 are sent to SU #1 via routing path 1, EDSs 4_1-4_5 are sent to SU #4 via routing path 3, EDSs 2_1-2_5 are sent to SU #2 via routing path 2, EDSs 3_1-3_5 are sent to SU #3 via routing path 2 (e.g., SUs #2 and #3 are at the same geographical location), and EDSs 5_1-5_5 are sent to SU #5 via routing path #4.

In this example, routing path 2 experiences an error (e.g., a network dropout or other error) that affects the storage of the third, fourth, and fifth sets of EDSs in SUs #2 and #3. Therefore, SU #2 successfully stores EDSs 2_1-2_2 of the first two sets of EDSs and SU #3 successfully stores EDSs 3_1-3_2 of the first two sets of EDSs. SUs #1, #4, and #5 successfully store all encoded data slices of the five sets sent. Based on error messages from SUs #2 and #3 and/or rebuild requests from SUs #2 and #3 (e.g., SUs #2 and #3 include rebuild agents (e.g., integrity processing units 20)), computing device 12 or 16 determines that of the five slices sent from each of set of encoded data slices, five are successfully stored from sets 1 and 2 and three are successfully stored from sets 3-5 as shown in routing path 1-6 performance information 84.

To determine the error rate associated with the set of storage units, the number of encoded data slices successfully stored from each set are subtracted from the number of encoded data slices sent from each set during the time period to determine one or more error amounts. For example, five slices are sent per set to the set of storage units. All five slices from sets 1 and 2 are successfully stored making the error amount for sets 1 and 2 zero. Three slices from sets 3-5 are successfully stored making the error amount for sets 3-5 each two (e.g., 5 slices sent−3 slices successfully stored=2). The one or more error amounts are then divided by the number of encoded data slices sent per set during the time period to produce one or more encoded data slice set error rates. For example, the encoded data slice set error rate for sets 1 and 2 is 0 (e.g., 0 error amount/5 slices sent=0) and the encoded data slice set error rate for sets 3-5 is 0.4 (e.g., 2 error amount/5 slices sent=0.4). The encoded data slice set error rates are then averaged to determine the error rate 86 associated with the set of storage units. In this example, the error rate 86 is 0.24 (e.g., 0.4+0.4+0.4+0+0=1.2, 1.2/5 storage units=0.24).

The routing path information 84 may additionally include other information pertaining to the set of storage units 82 and the routing paths 1-6. For example, the identity of storage units with storage errors could be included in routing path information. If the same storage units continue to experience errors, corrective measures can be implemented (e.g., different storage units are selected for storage, different routing paths are selected, defective storage units are taken offline, etc.).

Based on routing path performance information 84, computing device 12 or 16 adjusts dispersed storage error encoding parameters to improve storage efficiency and/or reliability. For example, computing device 12 or 16 adjusts a pillar width (PW) to decode threshold (DT) ratio of a dispersed storage error encoding function when the routing path performance information 84 deviates from a performance threshold 88. The performance threshold 88 includes a first error rate threshold 90 and a second error rate threshold 92.

As a specific example, first error rate threshold 90 is set at 0.06 and second error rate threshold 92 is set at 0.2. First error rate threshold 90 is a lower limit of the performance threshold 88 meaning that anything equal to or lower than first error rate threshold 90 (e.g., an error rate that compares favorably to the first error rate threshold 90) warrants a change because the performance is determined to be higher than required and more errors could be tolerated in exchange for efficiency (e.g., faster storage, faster processing, increased storage capacity, etc.).

Second error rate threshold 92 is an upper limit of the performance threshold 88 meaning that anything equal to or higher than second error rate threshold 92 (e.g., an error rate that compares unfavorably to the second error rate threshold 92) warrants a change because the performance is unsatisfactory and greater reliability is needed. Error rates between 0.06 and 0.2 are acceptable in this example and would require no change to the pillar width to decode threshold ratio.

In this example, the error rate 86 is 0.24 and is thus higher than second error rate threshold 92. Because the error rate 86 compares unfavorably to the second error rate threshold 92, computing device 12 or 16 adjusts the pillar width to decode threshold ratio by increasing the pillar width number for greater reliability. For example, the original pillar width to decode threshold ratio 94 was PW=5 and DT=3. The adjusted pillar width to decode threshold ratio 96 is now PW=6 and DT=3. Alternatively, when error rate 86 compares unfavorably to the second error rate threshold 92, computing device 12 or 16 adjusts the pillar width to decode threshold ratio by increasing the pillar width number as well as increasing the decode threshold number.

Computing device 12 or 16 dispersed storage error encodes a data object using the adjusted pillar width to decode threshold ratio to produce a plurality of sets of encoded data slices and sends the plurality of sets of encoded data slices to the set of storage units 82 via the set of routing paths 1-6 for storage therein.

Figure 10:
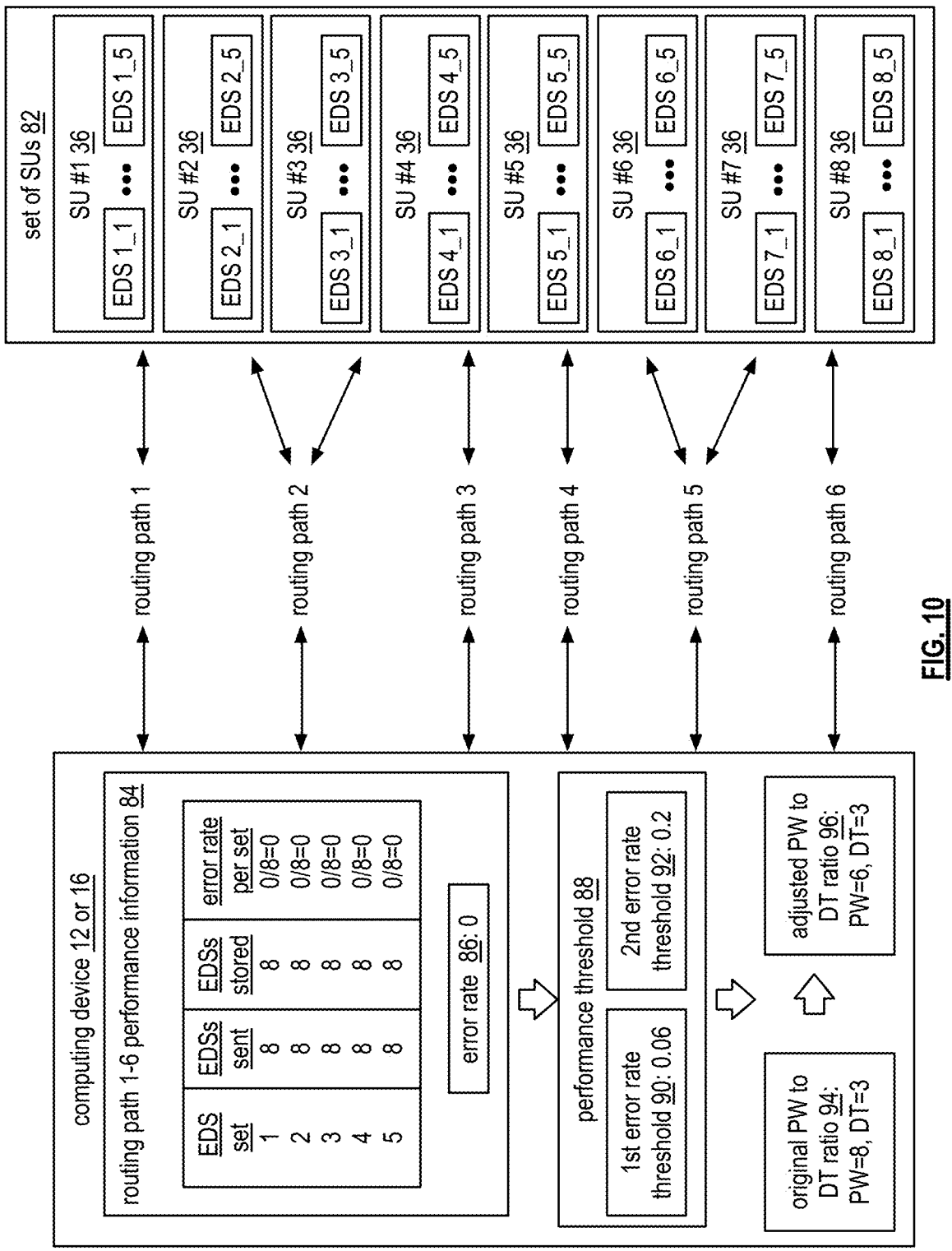
FIG. 10 is a schematic block diagram of another embodiment of the dispersed or distributed storage network (DSN) in accordance with the present invention.

FIG. 10 is a schematic block diagram of another embodiment of the dispersed or distributed storage network (DSN) that includes computing device 12 or 16 and a set of storage units (SUs) 82. FIG. 10 operates similarly to FIG. 9 except that in this example, five sets of encoded data slices (EDSs) are sent to the set of storage units 82 during a time period where each set has a pillar width (PW) of 8 and a decode threshold (DT) of 3. Therefore, the five sets of EDSs are sent to all eight storage units of the set of storage units. Further, in this example, no routing path errors (or other storage errors) occur such that all encoded data slices that are sent for storage are successfully stored in the set of storage units 82. As shown in routing path 1-6 performance information 84 eight EDSs are sent from sets 1-5 and eight EDSs from sets 1-5 are successfully stored.

Routing path 1-6 performance information 84 indicates that the error rate 86 is 0. Computing device 12 or 16 compares error rate 86 to first error rate threshold 90 and second error rate threshold 92 to determine whether the pillar width to decode threshold ratio requires adjustment. Here, the error rate 86 compares favorably to the first error rate threshold 90 (e.g., 0 is lower than 0.06) and a change to the pillar width to decode threshold ratio is warranted for increased efficiency. Therefore, the computing device 12 or 16 adjusts the pillar width to decode threshold ratio by decreasing the pillar width number and maintaining the decode threshold number.

For example, the original pillar width to decode threshold ratio 94 was PW=8 and DT=3. The adjusted pillar width to decode threshold ratio 96 is now PW=6 and DT=3. Alternatively, when error rate 86 compares favorably to the first error rate threshold 92, computing device 12 or 16 adjusts the pillar width to decode threshold ratio by maintaining the pillar width number and increasing the decode threshold number.

Figure 11:
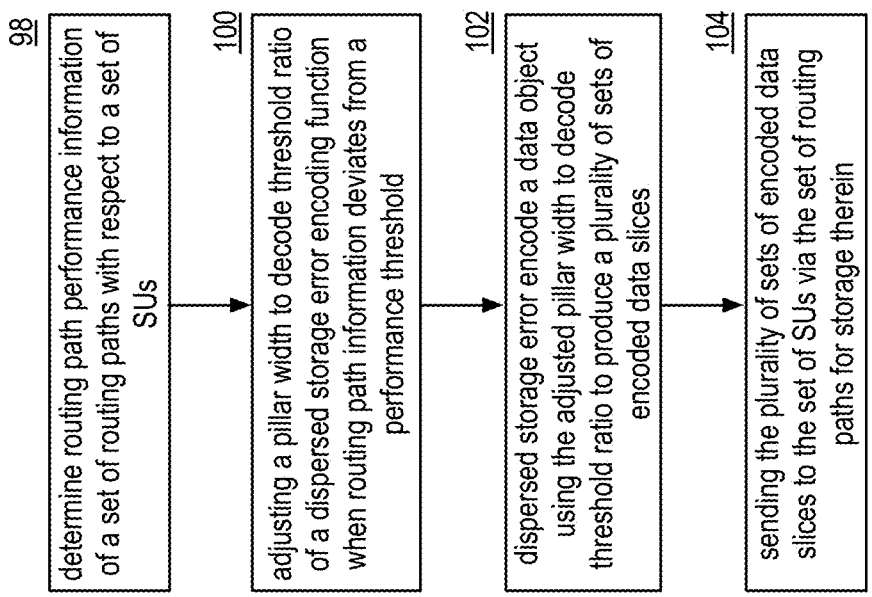
FIG. 11 is a logic diagram of an example of a method of adjusting dispersed error encoding parameters based on routing path performance in accordance with the present invention.

FIG. 11 is a logic diagram of an example of a method of adjusting dispersed error encoding parameters based on routing path performance. The method begins with step 98 where a computing device of a dispersed storage network (DSN) determines routing path performance information of a set of routing paths with respect to a set of storage units of the DSN.

Routing path performance information includes a number of encoded data slices of each of one or more sets of encoded data slices sent to the set of storage units during a time period, a number of encoded data slices of each of the one or more sets of encoded data slices successfully stored by the set of storage units during the time period, and an error rate associated with the set of storage units based on the number of encoded data slices sent and the number of encoded data slices successfully stored.

To determine the error rate associated with the set of storage units, the number of encoded data slices successfully stored are subtracted from the number of encoded data slices sent during the time period to produce one or more error amounts. The one or more error amounts are then divided by the number of encoded data slices sent per set during the time period to produce one or more encoded data slice set error rates. The encoded data slice set error rates are then averaged to determine the error rate associated with the set of storage units.

The method continues with step 100 where the computing device adjusts a pillar width to decode threshold ratio of a dispersed storage error encoding function when the routing path performance information deviates from a performance threshold. The performance threshold includes a first error rate threshold and a second error rate threshold. For example, the error rate is compared to the first and second error rate thresholds. When the error rate compares favorably to the first error rate threshold, the computing device adjusts the pillar width to decode threshold ratio by decreasing a pillar width number and maintaining a decode threshold number. When the error rate compares unfavorably to the second error rate threshold, the computing device adjusts the pillar width to decode threshold ratio by increasing the pillar width number and maintaining the decode threshold number.

As another example, when the error rate compares favorably to the first error rate threshold, the computing device adjusts the pillar width to decode threshold ratio by increasing a decode threshold number and maintaining a pillar width number. As a further example, when the error rate compares unfavorably to the second error rate threshold, the computing device adjusts the pillar width to decode threshold ratio by increasing the pillar width number and increasing the decode threshold number.

The method continues with step 102 where the computing device dispersed storage error encodes a data object using the adjusted pillar width to decode threshold ratio to produce a plurality of sets of encoded data slices. The method continues with step 104 where the computing device sends the plurality of sets of encoded data slices to the set of storage units via the set of routing paths for storage therein.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc.

that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more computing devices, the method comprises:
    selecting a first routing path from a plurality of routing paths to a set of storage units based on routing path performance information, wherein the first routing path has a performance level greater than a first performance threshold;
    selecting a second routing path from the plurality of routing paths based on the routing path performance information, wherein the second routing path has a performance level less than or equal to the first performance threshold;
    sending a first subset of encoded data slices to the set of storage units via the first routing path for storage therein; and
    sending a second subset of encoded data slices to the set of storage units via the second routing path for storage therein.

2. The method of claim 1 further comprises:
    dispersed storage error encoding a data segment to produce a set of encoded data slices, wherein the set of encoded data slices includes the first and second subsets of encoded data slices.

3. The method of claim 2 further comprises:
    obtaining data for transmission to the set of storage units, wherein the data includes the data segment.

4. The method of claim 1 further comprises:
    obtaining the routing path performance information for the plurality of routing paths from the computing device to a set of storage units of the storage network.

5. The method of claim 1 further comprises:
    determining one or more of communication requirements and routing path quality of service information for one or more of the plurality of routing paths; and
    determining the performance level of the first routing path based on the one or more of communication requirements and routing path quality of service information.

6. The method of claim 5, wherein the communication requirements comprises a current reliability level for the one or more of the plurality of routing paths.

7. The method of claim 5, wherein the routing path quality of service information comprises a reliability history for the one or more of the plurality of routing paths.

8. The method of claim 5, wherein the routing path quality of service information comprises a future reliability estimate for the one or more of the plurality of routing paths.

9. The method of claim 5, wherein the routing path quality of service information comprises bit jitter information.

10. The method of claim 5, wherein the routing path quality of service information comprises security information.

11. The method of claim 1 further comprises:
    determining an error coding distributed routing protocol for transmitting the encoded data slices.

12. The method of claim 11, wherein the error coding distributed routing protocol comprises an identity of the plurality of routing paths.

13. The method of claim 11, wherein the error coding distributed routing protocol comprises desired routing performance for one or more of the first and second subsets of encoded data slices.

14. The method of claim 11, wherein the error coding distributed routing protocol comprises a request for multiple path transmission for the sending of the set of encoded data slices to the set of storage units.

15. The method of claim 11, wherein the error coding distributed routing protocol comprises a capacity estimate of the plurality of routing paths.

16. The method of claim 1, wherein determining the first subset of the set of encoded data slices comprises:
    determining a decode threshold number; and
    determining the first subset of encoded data slices includes at least the decode threshold number.

17. The method of claim 16, wherein determining the second subset of the set of encoded data slices comprises:
    determining a first number of encoded data slices that is included in the first subset of encoded data slices;
    determining a pillar width number for the set of encoded data slices; and determining the second subset of encoded data slices is equal to the pillar width number minus the first number.

18. A computing device of a storage network, the computing device comprises:
- memory;
- an interface; and
- a processing module operably coupled to the memory and the interface, wherein the processing module is operable to:
  - select a first routing path from a plurality of routing paths to a set of storage units based on routing path performance information, wherein the first routing path has a performance level greater than a first performance threshold;
  - select a second routing path from the plurality of routing paths based on the routing path performance information, wherein the second routing path has a performance level less than or equal to the first performance threshold;
  - send, via the interface, a first subset of encoded data slices to the set of storage units via the first routing path for storage therein; and
  - send, via the interface, a second subset of encoded data slices to the set of storage units via the second routing path for storage therein.

19. The computing device of claim 18 further comprises:
- dispersed storage error encoding a data segment to produce a set of encoded data slices, wherein the set of encoded data slices includes the first and second subsets of encoded data slices.

20. The computing device of claim 19, wherein the processing module is further operable to:
- determining a first number of encoded data slices that is included in the first subset of encoded data slices based on a decode threshold number associated with the dispersed storage error encoding; and
- determining a second number of encoded data slices that is included in the second subset of encoded data slices based on a pillar width number associated with the dispersed storage error encoding minus the decode threshold number.

* * * * *